United States Patent Office.

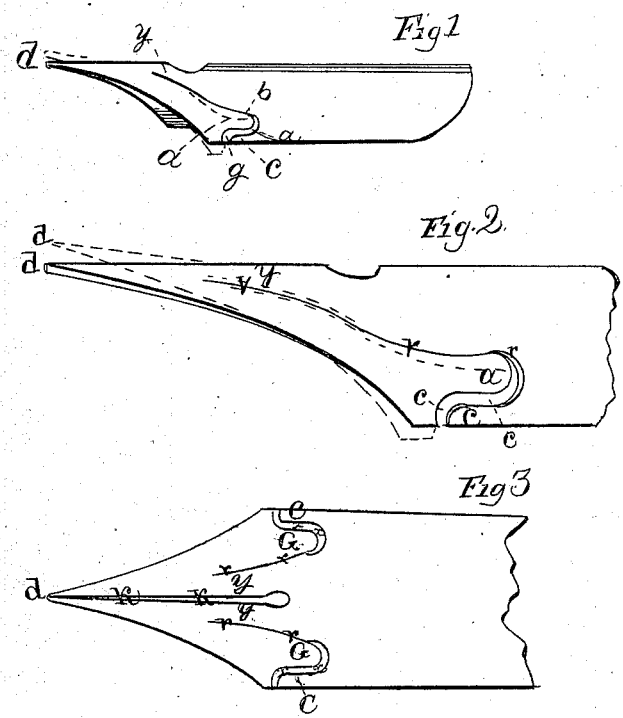

ADDISON G. WATERHOUSE, OF SAN FRANCISCO, CALIFORNIA

Letters Patent No. 97,735, dated December 7, 1869; antedated November 25, 1869.

IMPROVEMENT IN PENS.

The Schedule referred to in these Letters Patent and making part of the same.

*To all whom it may concern:*

Be it known that I, ADDISON G. WATERHOUSE, of the city and county of San Francisco, in the State of California, have invented a new and useful Improvement on Metallic Writing-Pens.

The nature of my invention consists in protecting the springs Y, by a shoulder or gauge, C, so as to prevent the springs Y from breaking, when too great strain is put upon the points $d$.

To enable others skilled in the art to make and use my invention, I will proceed to describe its construction and operation.

Figure 1 represents side of the pen, the slot $r\ r\ r$ being so cut as to form a spring, (see letter Y, on figs. 1, 2, 3,) between it and the point-slot K, and to form a lever, A, and a shoulder or gauge, C. When the points $d$ are sprung up by being pressed hard upon the paper, the levers A are pressed down, so that they rest on the shoulder or gauge C, and these preventing the springs Y from being sprung any further up than they can safely bear, so as to prevent the points from being broken off.

Figure 2 represents a top view of the pen, showing the springs Y, and part of the levers A.

Figure 3 represents the pen in a flat form, as it is stamped out before being bent into form, showing the slots $r\ r$ that form the levers A, the shoulders or gauge C, and the springs Y.

What I claim as my invention, and desire to secure by Letters Patent, is—

The application of the gauge or shoulders C, acting on the levers A, so as to prevent too great a strain being put upon the springs Y, and thereby preventing the points $d$ from being broken off.

A. G. WATERHOUSE

Witnesses:
 JOHN W. STEVENSON,
 WILLIAM D. NICHOLS.